(12) United States Patent
Bøgeskov-Jensen

(10) Patent No.: US 7,013,018 B2
(45) Date of Patent: Mar. 14, 2006

(54) EARRING FOR A HEADSET

(75) Inventor: Tom Bøgeskov-Jensen, Slangerup (DK)

(73) Assignee: GN Netcom A/S, Ballerup (DK)

( * ) Notice: Subject to any disclaimer, the term of this patent is extended or adjusted under 35 U.S.C. 154(b) by 0 days.

(21) Appl. No.: 10/250,500

(22) PCT Filed: Dec. 11, 2001

(86) PCT No.: PCT/DK01/00816

§ 371 (c)(1),
(2), (4) Date: Oct. 17, 2003

(87) PCT Pub. No.: WO02/054825

PCT Pub. Date: Jul. 11, 2002

(65) Prior Publication Data
US 2004/0066948 A1 Apr. 8, 2004

(30) Foreign Application Priority Data
Jan. 4, 2001 (DK) .............................. 2001 00011

(51) Int. Cl.
H04R 25/00 (2006.01)
(52) U.S. Cl. .................. 381/381; 381/370; 381/374
(58) Field of Classification Search ................ 381/309, 381/327, 330, 370–371, 374–376, 378, 379, 381/381, 383; 181/128, 129, 135, 137; 379/430
See application file for complete search history.

(56) References Cited

U.S. PATENT DOCUMENTS

| 3,915,166 A | 10/1975 | McCrink |
| 4,020,297 A | 4/1977 | Brodie |
| 4,881,616 A | 11/1989 | Janssen et al. |
| 4,893,344 A | 1/1990 | Tragardh et al. |
| 5,881,161 A | 3/1999 | Liu |
| 5,953,435 A | 9/1999 | Mullin et al. |

Primary Examiner—Huyen Le
(74) Attorney, Agent, or Firm—Altera Law Group, LLC

(57) ABSTRACT

An earring for a headset comprising a speaker and possibly a transducer or microphone, is arranged to be worn on one ear of a user so that the earring surrounds the outer ear of the user, and is arranged so that the size of the earring is adjustable. With the object of providing simple adjustment to the size of the ear of the user, the earring is produced with a hard part and a soft part, where the second part can be introduced into the first part. The adjustment of the size of the earring is effected with an adjustment button being secured to the soft part, in that the button with the soft part can be displaced in a channel, which is provided longitudinally in the hard part. The channel is possibly configured by the hard part being configured with a closing part. With the invention an adjustment arrangement for an earring for a headset is thus provided, which is easy for the user to operate, also when the earring is placed on the ear of a user.

15 Claims, 2 Drawing Sheets

EARRING FOR A HEADSET

Figure 1:
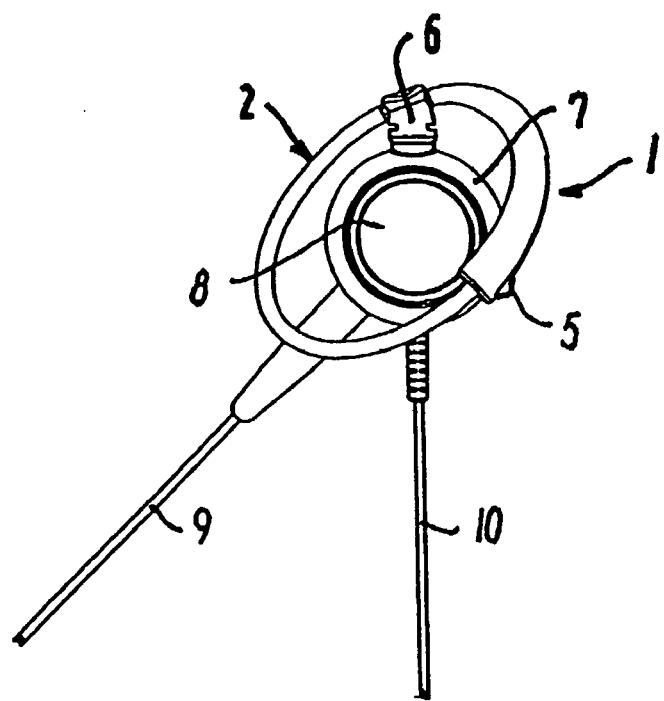

The invention concerns an earring for a headset of the kind disclosed in the preamble claim 1.

With the use of headsets, there is a need for several different ways in which to hold the headset on the ear, which is also called wear style. This is typically effected by means of a headband, but other wear styles have also been developed, among other things a flexible ear hook and rings of different sizes, which are elliptical in shape, and which are arranged to surround one ear of the user. In order to best satisfy the needs of the user, headsets are often delivered with a number of wear styles of different sizes, which naturally makes the product more expensive since the user often uses only one wear style.

U.S. Pat. No. 6,047,076 discloses an earring for securing a headset on a user's ear, where the earring surrounds the one, outer ear of the user. In order to more or less suit the shape of the ear, the earring is substantially a triangular ring, which is secured so that the ring can be turned in relation to the speaker housing. In order to avoid the above-mentioned disadvantages and other disadvantages, it is suggested that the earring be replaced by two adjustable ear braces facing towards each other and arranged to grip around the ear of the user. Such a construction is difficult to adjust and, moreover, becomes relatively voluminous when it is to be arranged so that the user can freely choose whether the headset shall be placed on the left or the right ear. The construction also suffers the weakness that it consists of many individual parts.

Also, U.S. Pat. No. 4,529,058 discloses a mounting arrangement for a headset, which arrangement consists of two pliable arms, where a muff is glued at the end of each arm, so that a part of the arm extends through the muff. The muff is further provided with a second hole, which is intended to accommodate an outwardly-extending part of an arm, so that the locking together comes to consist of two muffs in which the two arms are fixed. In this manner, the size of the loop, which is defined by the length of the arms, can be adjusted, in that the loop can be adjusted to suit ears of different sizes.

This known mounting arrangement suffers the disadvantage that it is not easy to adjust when it is mounted on the ear, in that in order to adjust the size of the loop the user must carry out several operations, in that he shall first introduce the one arm in the muff of the opposite arm and secure this in the muff, and repeat the operation for the other arm.

Further, U.S. Pat. No. 5,881,161 discloses a mounting arrangement for a headset, which arrangement consists of a flexible rod, which is secured by a headset. The free ends of the rod can engage with each other, in that the one end of the rod is provided with a plurality of protrusions, which can be engaged in a plurality of holes in the opposite end of the rod.

Finally, GB 2036505 discloses an ear-supported microphone, in which an earring is adjustable. The adjustment is carried out by fixing a sound energy tube to a housing by introducing the sound energy tube in a hole in the housing. This arrangement has the disadvantage that the microphone at the distal end of the sound energy tube is fixedly secured and not allowed to be adjusted.

By selecting a suitable combination of protrusions and holes, the loop, which is formed when the protrusions and the holes are brought together, can be adjusted to suit ears of different sizes.

Neither is this construction particularly easy to operate, in that it requires the use of two hands for the bringing together of the two ends of the rod. Moreover, after long-time use there is a risk that the protrusions and the holes will become worn and will thus disengage unintentionally.

Therefore, it is an object of the invention to provide a mounting arrangement for a headset, which is easy to operate, flexible in use, and without any risk of the headset being loosened unintentionally.

The object of the invention is achieved in that the earring consists of a closed ring having a first part and a second part, where the free end of the second part can be introduced into a channel in the first part for the coupling together of the parts, and in that it further comprises a pivotal coupling link adapted to be mounted on the earring, said coupling link being adapted to hold a housing for the speaker.

In this manner, an earring is provided, which easily and with one hand can be adjusted to suit ears of different sizes.

Moreover, it is thus easy to change the size of the earring, also when this is mounted on the ear, which for the individual user is an advantage from the point of view of comfort.

The coupling together can expediently be effected as disclosed in claim 2, where the coupling together of the parts is effected stepwise depending on the size of the earring or, as disclosed in claim 3, where the coupling together between the parts is effected in a sliding manner depending on the size of the earring.

This provides the possibility of the user being able to choose precisely the type of adjustment arrangement, which he feels is most suitable, in that some users prefer that there is a "clicking" sound when an adjustment is made, while others prefer a "silent, sliding" adjustment.

By configuring the earring according to the invention as disclosed in claim 4, i.e. by the first part consisting of a relatively hard plastic, while the second part consists of a relatively soft plastic or rubber, great freedom of choice is provided in the selection of material for the earring. It thus becomes possible to select the optimal material for each part.

As disclosed in claim 5, by the permanent coupling together between the two curved parts being configured by material from the end of the one part being introduced into and at least partly surrounded by material from the second end, e.g. by a two-component moulding, the advantage is achieved that even though the two parts are made of different materials, a simple and firm assembly is still achieved.

Advantageous choices of material for the hard and the soft part, respectively, are disclosed in claims 6 and 7.

The earring according to the invention can also be configured as disclosed in claim 11, in that the coupling link is arranged with an opening or openings so that it can be mounted on the earring before this is closed, said coupling element comprising means arranged to enter into engagement with a coupling part on a holding ring or the like, and arranged to hold a housing for the speaker.

Hereby a simple coupling of the earring together with the rest of the headset is achieved, in that this coupling together can be configured so that users themselves, if such a change is desired, can replace the earring with an ear hook or a headband in a simple manner.

The earring according to the invention can also be configured as disclosed in claim 12, where the permanent coupling comprises an annular, Radial groove or narrowing-down in the one of the curved parts, preferably in that part which is configured of relatively hard material, said groove or narrowing-down being arranged to enter into engagement with a projection on the coupling part. The parts are hereby mutually secured in position, but such that they are still relatively easy to separate.

Further expedient embodiments of the earring according to the invention are disclosed in claims 8–10.

Figure 2:
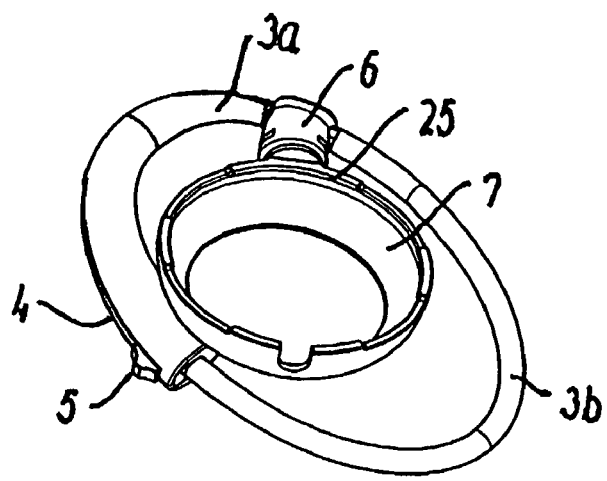
Figure 3:
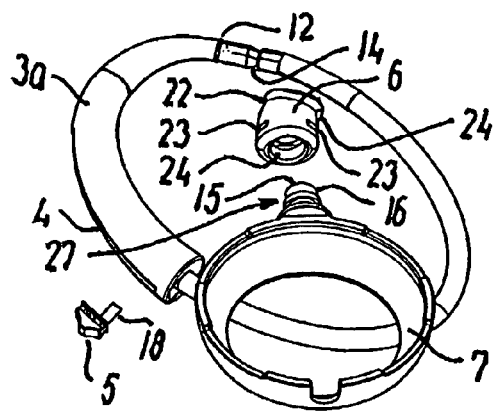
Figure 4:
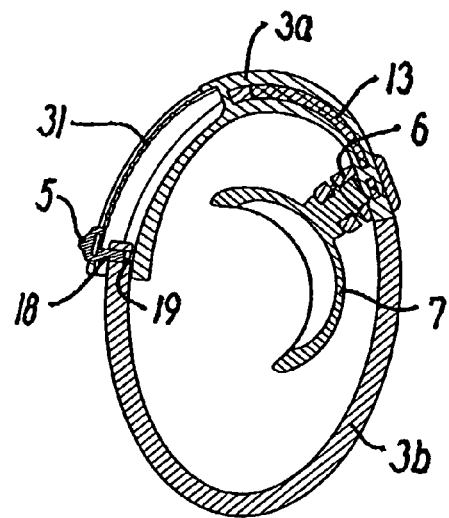
Figure 5:
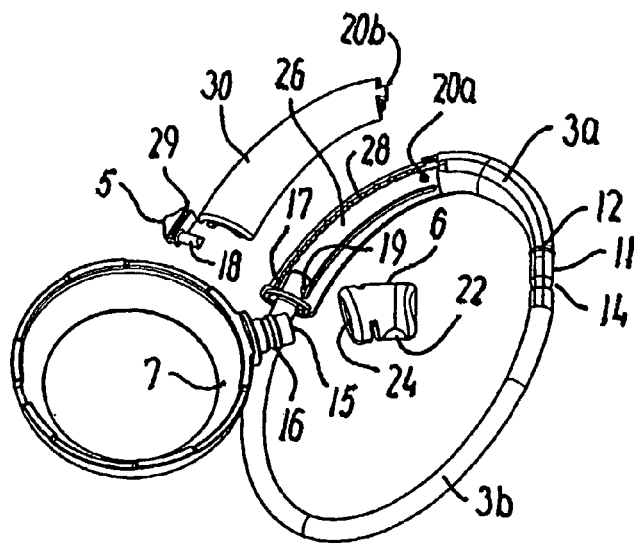

The invention will now be explained in more detail with reference to the drawing, where FIG. 1 shows a headset with adjustable earring according to the invention, FIG. 2 shows the earring according to the invention with holding ring, FIG. 3 shows the same as in FIG. 2, but where the parts are separated from one another, FIG. 4 shows the earring according to the invention in section, while FIG. 5 shows a second embodiment of the earring according to the invention.

FIG. 1 of the drawing shows a headset 1 with adjustable earring 2 according to the invention. The headset comprises a housing 8 for a speaker or transducer, and on this housing a microphone boom 9 with a not-shown microphone, and possibly a connection lead 10 with signal wires to the microphone and the speaker can be mounted. In the cases where a wireless headset is involved, use is naturally not made of a lead 10. The transducer housing 8 is secured by a holding ring 7, which via a pivotal coupling link 6 couples the adjustable earring to the headset. The shown example is simply an example of the use of the adjustable earring according to the invention, and it will obvious to those familiar with the art that the earring according to the invention can be used in connection with headsets of other types.

FIG. 2 shows the adjustable earring without transducer and microphone, and it is seen that the earring comprises two curved parts 3a, 3b that together constitute the closed earring 2. The earring further, comprises an adjustment button 5, which extends in a channel 4, which is demarcated uppermost by a slot.

The individual parts will now be explained in further detail with reference to FIGS. 3 and 4 of the drawing.

FIG. 3 shows the earring comprising the curved part 3a of relatively hard plastic, e.g. made of one of the materials polypropylene, polycarbonate, acrylnitril-butadien-styrol, hard polyurethane or of polyoxymethylene, and the curved part 3b of relatively soft material, e.g. soft rubber or plastic, such as polyurethane or thermoplastic polymers.

The two parts are firmly coupled together by a tongue-shaped part 13 (see FIG. 4) of the soft material, of which the part 3b is made, extending into the curved, hard part 3a, and is secured hereto.

The fastening is preferably configured by the ring 3a, 3b being moulded as a one-part unit by a two-component moulding, so the parts are melted together at the coupling point during the moulding. In addition, at the coupling point an annular stop bead 12 and a similarly annular, narrowed-down part 14 are configured. Said bead and annular groove or narrowing-down are configured in the part 3a, i.e. in the relatively hard material, and their function is explained in more detail In connection with the embodiment In FIG. 5.

A hole 19, cf. FIG. 4, is configured in the other end of the part 3b.

FIG. 3 also shows the adjustment button 5 with a forwardly-facing retaining pin 18, said retaining pin being arranged to enter into firm engagement with the hole 19 in the part 3b, cf. FIG. 4. The adjustment button can be displaced in a channel 4 provided in the free end of the part 3a. In this way, the size of the earring 3a, 3b can be regulated by displacement of the adjustment button in the channel.

Along those sides of the channel where the adjustment button 5 protrudes through this channel, a serrated part 31 can be provided, which means that the adjustment button can be displaced in steps and be secured in different positions along the channel.

Alternatively, along the channel friction areas can be provided, which influence the button in such a manner that a certain force is required to move the button. In this way a sliding displacement and positioning of the adjustment button can be achieved.

FIG. 3 also shows that the coupling-together link 6 is tubular and has an opening 24, which constitutes a bottom hole, in that the second end of the tube 27 is closed. Transversely there are two openings 22 which are arranged for passage of the earring, and also one or more through-going slots 23 which serve to make the coupling link slightly flexible and resilient.

Finally, FIG. 3 shows the holding ring 7, which has beads on the inner side for the clicking-on of a speaker housing, cf. also FIG. 1. The holding ring further comprises an outwardly-facing coupling part 27 which is circular in cross-section and is terminated with a projection 15, the function of which will be explained later in connection with the embodiment in FIG. 5. The coupling part 27 also comprises an annular rib 16.

FIG. 5 shows a second embodiment of the invention, where use is made of the same reference numbers for parts, which are identical with the parts for which the reference numbers are used in the remaining figures. As will be seen, the part 3a has an area 26 at its free end, which is open and arranged to be covered by a closing part 30.

The free end of the open area 26 comprises a bridge or ring 19, which is an integral part of the part 3a. The area 26 is moreover of hollow configuration, and when the closing part 30 is mounted, a channel or hollow tube with a slot is formed in which the free end of the part 3b can be inserted as shown.

The downwards-facing end of the closing part 30 shown in the drawing is arranged to enter into engagement with the bridge 17, and the inner side of the other end of the closing part 30 comprises a snap-part 20b, which is arranged to enter into engagement with a snap-part 20a.

The closing part 30, the adjustment button 5, the coupling link 6 and the holding ring 7 are preferably produced by injection moulding in relatively hard plastic, e.g. the same type of plastic as the curved part 3a.

The two curved parts 3a, 3b have a round or oval cross-sectional shape, so that the ear set is made comfortable to wear for the user.

What is claimed is:

1. A headset comprising an earring, a housing for a speaker said headset being arranged to be worn on one ear by a user so that the earring surrounds the user's outer ear, said earring being arranged in such a manner that it is size adjustable, wherein the earring comprises a closed ring whose size is adjusted while, at all times, remaining a closed loop, said ring having a first part and a second part, where the one end of the first part is contained within a channel in the second part for the coupling together of the parts, and in that it further comprises a pivotal coupling link adapted to be mounted on the earring, said coupling link being connected to said housing for the speaker;

and wherein said channel is sized to receive said one end of the first part and wherein the one end is surrounded by said channel and said end and channel together form a size adjustment coupling.

2. A headset according to claim 1, wherein said size adjustment coupling is effected in stepwise increments.

3. A headset according to claim 1, wherein said size adjustment coupling is effected in a generally continuous sliding manner.

4. A headset according to claim 1, wherein the channel comprises a relatively hard plastic, while the first part comprises a relatively soft plastic or rubber.

5. A headset according to claim 4, wherein the channel extends in the hard plastic and is demarcated upwards by a removable closing part configured in the hard part.

6. A headset according to claim 1, wherein the first and the second part together form a single rotatable coupling, and wherein at their ends which face outwardly away from the coupling, are joined together by the end of the second part being introduced into and at least partly surrounded by the end of the first part.

7. A headset according to claim 1, wherein the first part consists of one of the materials polypropylene, polycarbonate, acrylnitril-butadien-styrol, hard polyurethane or of polyoxymethylene.

8. A headset according to claim 1, wherein said size adjustment coupling is effected in a generally stepwise manner while at all times forming a continuous loop.

9. A headset according to claim 1, wherein the coupling comprises an operating button in said second part for adjustment of the size of the earring by releasable allowing the first part to slide into the channel.

10. A headset according to claim 1, wherein the channel and said end of the first part together form said size adjustment coupling further including an operating button which engages said channel so as to lock and release said coupling as selected by the user.

11. A headset according to claim 1, wherein the coupling link includes a pass through opening configured to allow said earring to pass uninterruptedly through said coupling link.

12. A headset according to claim 11, wherein the coupling link comprises an annular, radial rib in the one of the parts and a space for receiving said rib in the other of said parts, so that said parts are maintained rotatably joined to each other.

13. A headset according to claim 1, wherein the earring comprises the closed loop ring having the pivotal coupling link extending generally radially inwardly therefrom and configured to pivotally couple to a speaker mount, so that said earring may rotate around an axis which is generally orthogonal to said loop ring around said pivotal coupling link thereby allowing the user to position said speaker mount at a convenient position relative to the ear canal and to allow the user to fit the headset on either ear.

14. A headset of claim 13 wherein said speaker mount rotates generally orthogonally from said ear ring.

15. A headset according to claim 13 wherein the one end of the first part is maintained surrounded within the channel in the second part to create said closed loop for the coupling together of the parts.

* * * * *